(12) United States Patent
Auchmoody et al.

(10) Patent No.: US 7,680,998 B1
(45) Date of Patent: Mar. 16, 2010

(54) JOURNALED DATA BACKUP DURING SERVER QUIESCENCE OR UNAVAILABILITY

(75) Inventors: Scott Auchmoody, Irvine, CA (US); Eric Olsen, Lake Forest, CA (US); Scott Ogata, Lake Forest, CA (US)

(73) Assignee: EMC Corporation, Hopkinton, MA (US)

( * ) Notice: Subject to any disclaimer, the term of this patent is extended or adjusted under 35 U.S.C. 154(b) by 239 days.

(21) Appl. No.: 11/757,280

(22) Filed: Jun. 1, 2007

(51) Int. Cl.
*G06F 12/00* (2006.01)

(52) U.S. Cl. .................. 711/162; 711/216; 711/163; 711/113; 711/E12.051; 707/648; 707/698

(58) Field of Classification Search .................. 711/162
See application file for complete search history.

(56) References Cited

U.S. PATENT DOCUMENTS

| | | | |
|---|---|---|---|
| 6,865,655 B1 * | 3/2005 | Andersen | 711/162 |
| 6,928,526 B1 * | 8/2005 | Zhu et al. | 711/154 |
| 2004/0143713 A1 * | 7/2004 | Niles et al. | 711/162 |
| 2005/0131900 A1 * | 6/2005 | Palliyll et al. | 707/10 |
| 2007/0106713 A1 * | 5/2007 | Allen et al. | 707/204 |
| 2007/0260654 A1 * | 11/2007 | Creamer et al. | 707/206 |

* cited by examiner

*Primary Examiner*—Reginald G Bragdon
*Assistant Examiner*—Arvind Talukdar
(74) *Attorney, Agent, or Firm*—Workman Nydegger (57) ABSTRACT

A backup is performed by a client at a time when a backup server is unable to process the backup. The client maintains a cache including a root tag vector and hash entries. The client begins a backup by writing the root tag vector to a journal file and breaking files into pieces. For each piece, the client performs a hash and compares the resulting hash to entries in the cache. If the hash does not match any entries, the client records a request in the journal file to add the corresponding piece of data to an archive. After completing the backup, the journal file can be sent to the server. Before processing the journal file, the server validates the root tag vector. If the root tag vector is valid, the server processes each of the requests to add data. Otherwise, the server discards the journal file.

16 Claims, 8 Drawing Sheets

JOURNALED DATA BACKUP DURING SERVER QUIESCENCE OR UNAVAILABILITY

CROSS-REFERENCE TO RELATED APPLICATIONS

Not applicable.

BACKGROUND OF THE INVENTION

1. The Field of the Invention

The present invention relates to data storage and backup solutions for archiving data. More particularly, embodiments of the invention relate to software, hardware, systems, and methods for generating and processing backups when a backup server is unable to process the backup at the time of generation.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that such data protection be done in a cost effective manner with a reduced cost per bit for stored data sets.

To address these demands, Content Addressed Storage (CAS) has been developed to provide a more cost effective approach to data backup and archiving. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The usage of CAS enables data protection systems to store, online, multi-year archives of backup data by removing storage of redundant data because complete copies of data sets do not have to be stored as long as that content is stored and available. The use of CAS removes the challenges of maintaining a centralized backup index and also provides a high level of data integrity. CAS-based backup and archive applications have also improved the usage network and data storage resources with better distribution of data throughout a multi-node data storage system.

CAS-based backup and archive applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

While providing higher efficiency data storage, current CAS-based data storage systems often lack protocols for backing up data on a client disconnected from a backup server. This can be a significant problem, for example, for a business person or other individual that frequently travels with a laptop or other device for which backups are desired. Current CAS-based data storage systems additionally often lack protocols for backing up data on a client during maintenance windows (e.g., while the backup server performs maintenance on content addressed storage). Accordingly, current CAS-based data storage systems can be improved by enabling the backup of data when a backup server is unable to process the backup due to a maintenance window, a client being disconnected from the backup server, and the like or any combination thereof

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Embodiments of the invention are directed to methods and systems for generating and/or processing backups when a backup server is unable to contemporaneously process the backups. Briefly, embodiments of the invention involve a client determining that a backup server is unable to contemporaneously process a backup currently being generated by the client. In this case, the client writes a root tag vector to a journal file and determines whether data being backed up is already stored on the server. This may include dividing the data being backed up into pieces of data, taking a hash of each piece of data, and comparing the hash to a hash cache of previously backed up pieces of data, the hash cache being maintained on the client. For pieces of data whose hashes are not present in the hash cache, the client records, in the journal file, a request to add the data to storage, which can be processed by the server at a later time.

Embodiments of the invention also involve a backup server processing a backup embodied in a journal file generated by a client at a time when the backup server was unable to contemporaneously process the backup. In this case, the backup server receives the journal file, which includes a root tag vector and one or more requests to add pieces of data to storage. Prior to processing the requests, the server validates the root tag vector by comparing root hashes identified in the root tag vector to root hashes accessible to the server. The root hashes accessible to the server can identify data accessible to the server (e.g., in storage). If at least one of the root hashes identified in the root tag vector does not match the accessible root hashes, the requests may not be processed. In contrast, if every root hash identified in the root tag vector matches at least one of the accessible root hashes, the requests are typically processed.

To practice the invention, the client, backup server, and storage may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which backups of digital data are generated and maintained.

Figure 1:
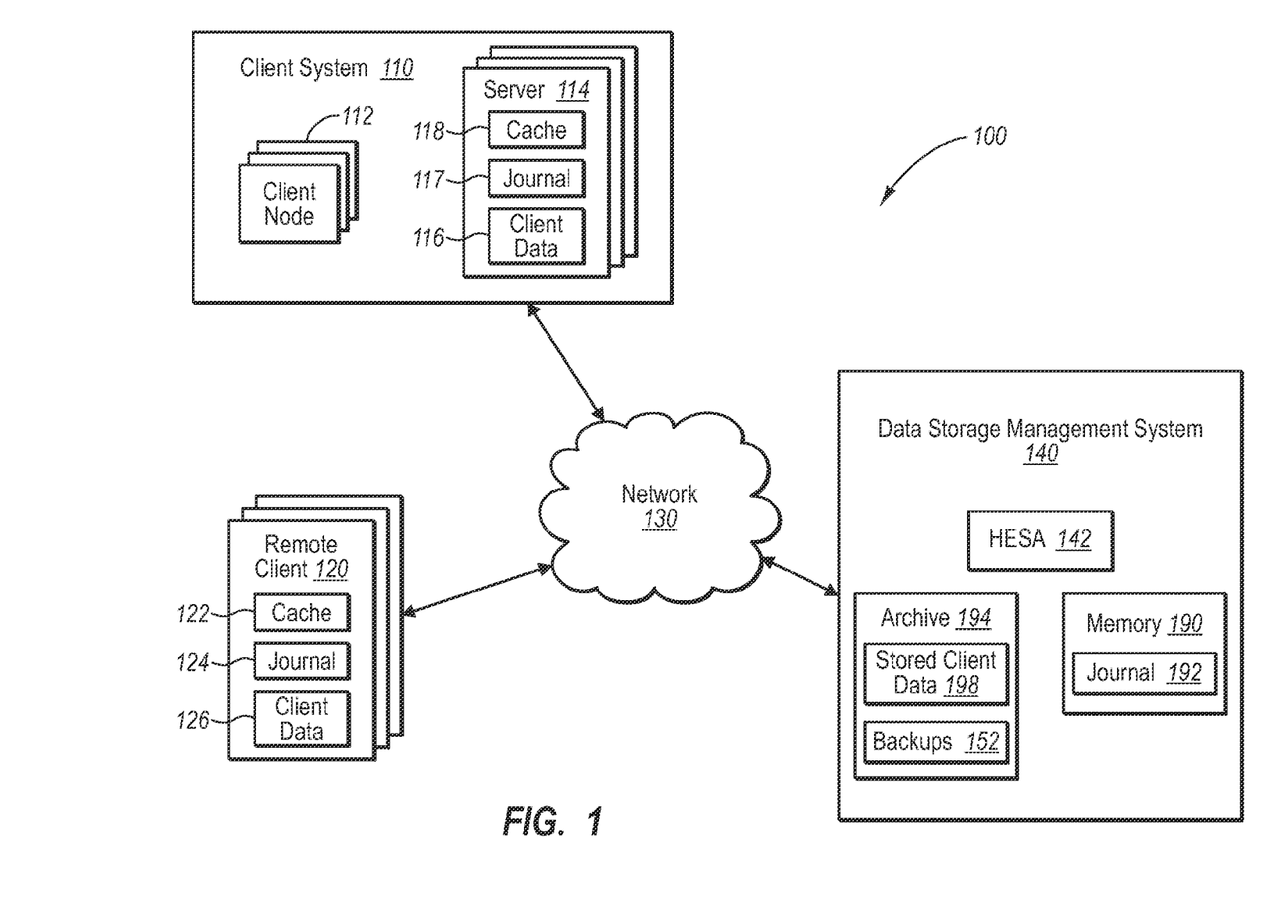
FIG. 1 illustrates one embodiment of a data storage or data protection system which implements aspects of the invention.

With reference now to FIG. 1, a data storage (or data protection) system 100 is illustrated which implements aspects of the invention. The system 100 is shown in simplified or example form and is intended to represent a distributed network of computer systems/devices that generate digital data that is protected with copies stored in an archive or backup file system (such as a disk, tape, or other archival solution). The backup or data protection is managed by a data storage management system 140 that may be provided remotely as shown and/or be provided all or in part as part of a client system (e.g., client systems 110, 120 may include an instance of a storage application). The data storage management system 140 may also be referred to herein as a backup server, hash file system ("HFS") server, or content addressed storage ("CAS") server.

As shown, the system 100 includes a client system or network 110 such as a data center that includes a plurality of client nodes 112 such as desktops, laptops, or the like that are networked to one or more servers (or other memory devices) 114. Each server 114 may include memory for storing one or more caches 118 and/or one or more journaled backup files 117, discussed in greater detail below. Client data 116 generated by or accessed by the client nodes 112 can additionally be stored on the servers 114 to allow ready access.

One or more remote clients 120 can link to the client system 110 and/or to the data storage management system 140 via communications network 130 (e.g., a LAN, a WAN, the Internet, or other wired and/or wireless digital communications network). The remote client 120 also includes memory for storing one or more caches 122 and one or more journaled backup files 124. In addition, the remote client 120 may store client data 126 generated by or accessed by the remote client 120.

The client data 116 and/or 126 is managed for data protection by the data storage management system 140. Generally, such data protection involves a high efficiency storage application 142 storing copies 198 of the client data 116, 126 in archive 194. According to one embodiment of the invention, the data storage management system 140 additionally includes memory 190 wherein journaled backup files 192 may be written while the archive 194 is not accessible to the client system 110 and/or remote client 120. The archive 194 and/or memory 190 may take many forms such as disk storage, holographic systems, tape storage, other memory mechanisms, and combinations of such mechanisms that are useful for archiving large amounts of digital information. Further, the archive 194 and/or memory 190 may be integrated with the HFS server 140 as shown and/or may be in a remote location. In the present embodiment, the archive 194 comprises content addressed storage ("CAS").

In one embodiment of the invention, the storage application 142 is a high efficiency application that controls the size of the stored client data 198 such as by storing limited copies of data objects or atomics and/or changes to stored content. For example, the application 142 may be a CAS or HFS application. Various embodiments of example CAS systems and related methods are disclosed in commonly assigned U.S. Pat. No. 6,704,730 (the '730 patent) and commonly assigned U.S. Pat. No. 6,810,398 (the '398 patent), both of which are incorporated herein by reference in their entirety.

Figure 2:
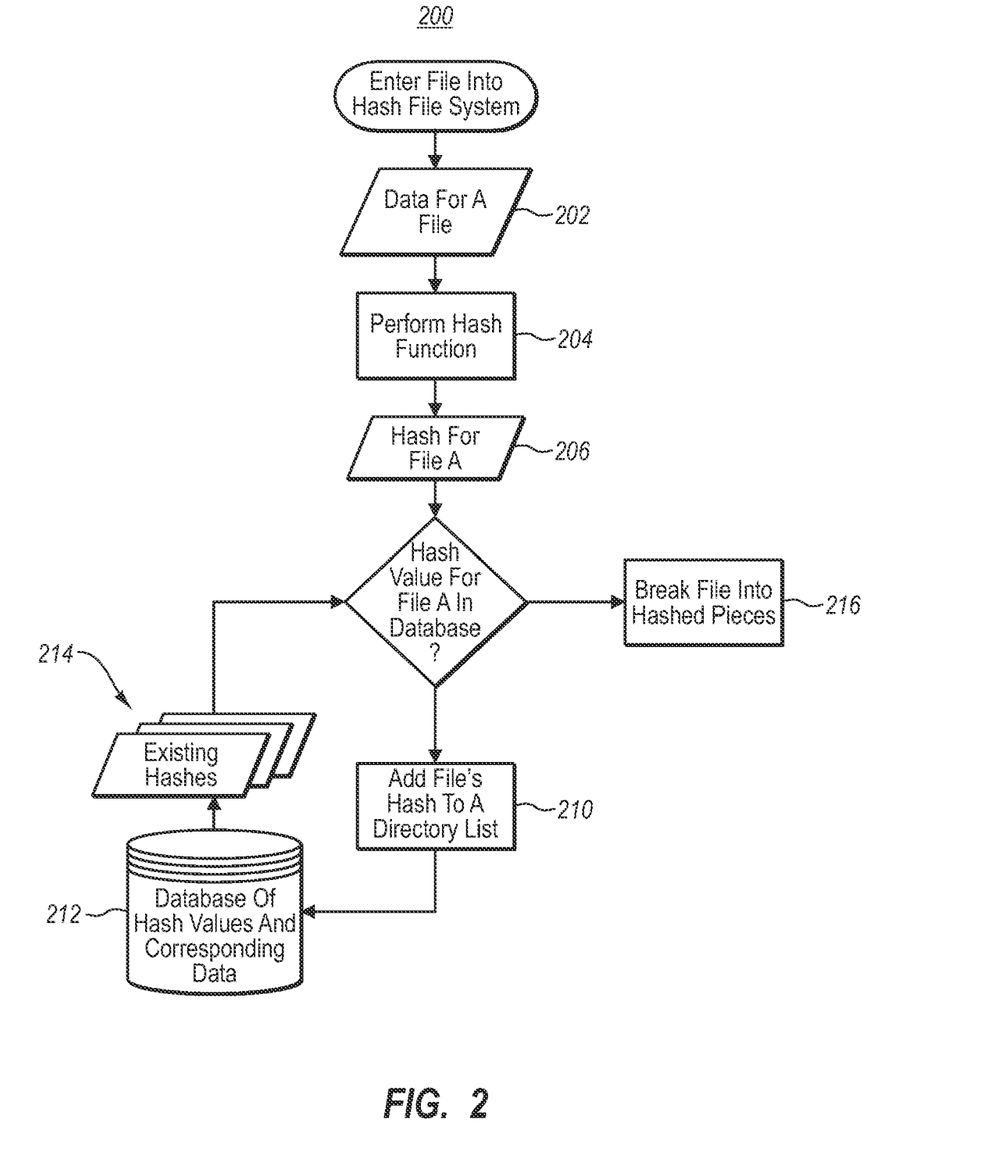
FIG. 2 is a flow chart depicting one embodiment of a method for entering a computer file in to an archive of FIG. 1.

With reference additionally now to FIG. 2, a logic flow chart is shown depicting the process of entry of a computer file into the archive 194. The computer file may be generated by a user on a client node or on a remote client, for example, and may correspond to the client data 116 or 126. Any digital sequence could also be entered into the archive of the HFS server 140 in the present embodiment in much the same way, but the current example wherein the digital sequence entered consists of a computer file is instructive.

The process 200 begins after a computer file 202 ("File A") is received by the storage application 142 from the server 114 or remote client 120. The storage application performs 104 a hash function on File A and the resulting hash value (also referred to as a "hash" or "content hash") 206 of File A is compared 208 to the contents of a database 212 containing hash file values. In one embodiment of the invention, the database 212 may be stored in the archive 194 of FIG. 1. If the hash value 206 of File A is already in the database, then the file's hash value is added 210 to a hash recipe. This hash recipe includes, in one embodiment, of the data and associated structures needed to reconstruct a file, directory, volume, or entire system depending on the class of computer file data entered into the system. The contents of the database 212 comprising hash values and corresponding data is provided in the form of existing hash values 214 for the comparison operation of decision step 208. On the other hand, if the hash value 206 for File A is not currently in the database, at step 216 the file is broken into pieces, each piece is hashed, and the pieces, hashes of each piece, and hash value 206 for File A are stored in the database 212. A record may be generated containing the hash of File A as well as the hash of the pieces of File A, as illustrated in FIG. 3.

Figure 3:
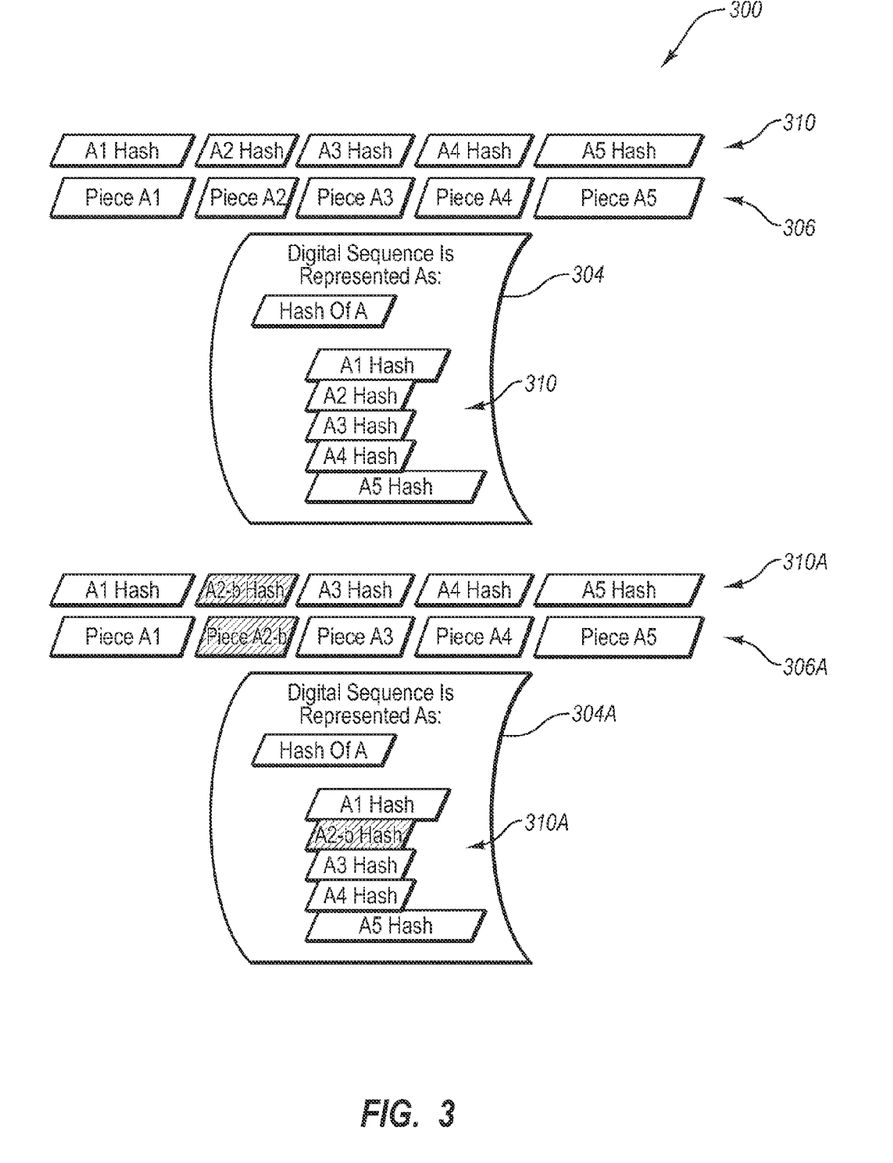
FIG. 3 is a diagram comparing pieces of a computer file before and after an edit of the computer file.

With reference additionally now to FIG. 3, a comparison 300 of the pieces 306 of the representative computer File A with their corresponding hash values 310 is shown both before and after editing of a particular piece of the file. In this example, the record 304 contains the hash value of File A as well as the hash values 310 of each of the pieces of the file A1 through A5. A representative edit or modification of the File A may produce a change in the data for piece A2 (now represented by A2-*b*) of the file pieces 306A along with a corresponding change in the hash value A2-*b* of the hash values 310A. The edited file piece now produces an updated record 304A that includes the modified hash value of File A and the modified hash value of piece A2-*b*.

Figure 4:
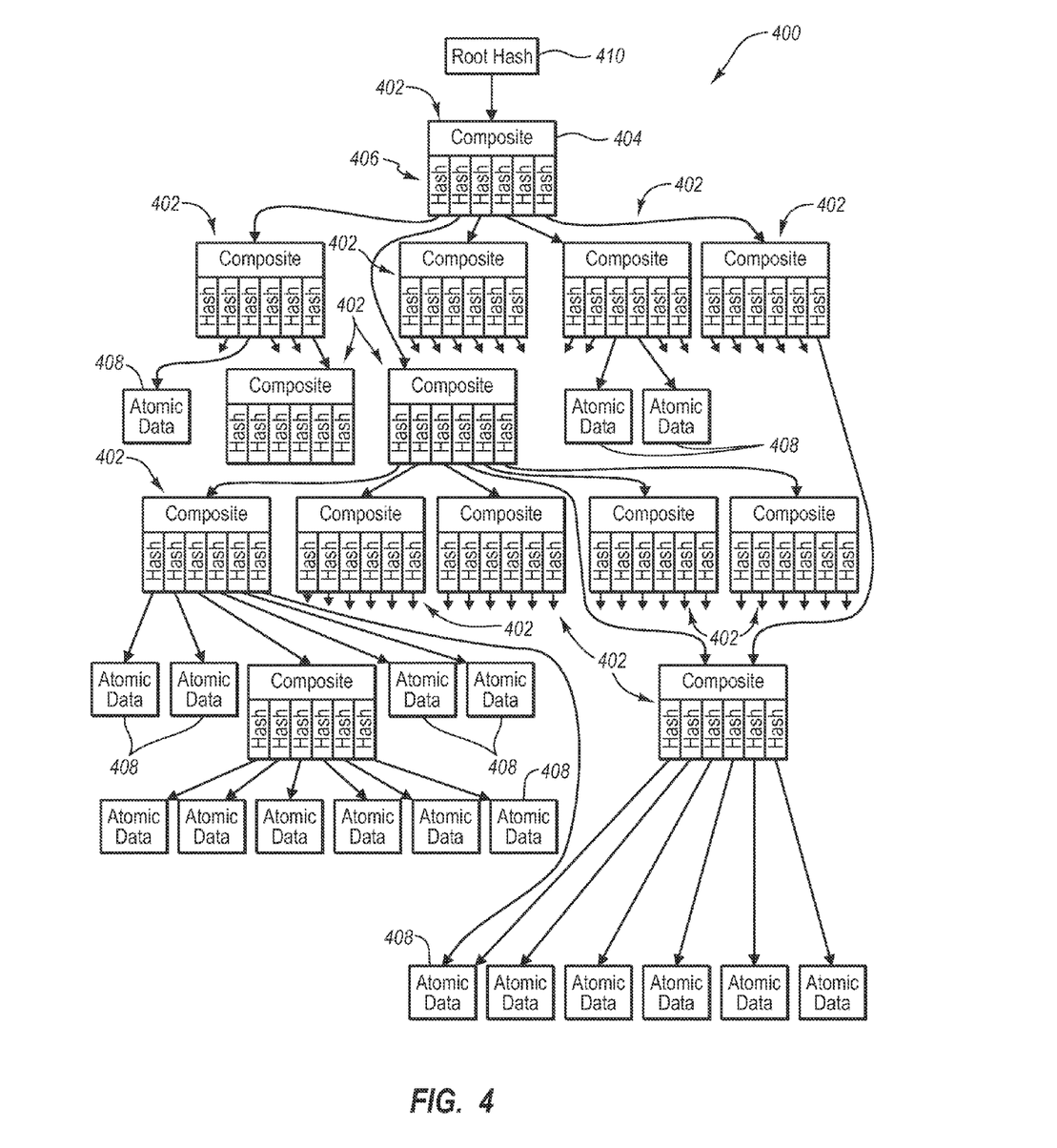
FIG. 4 conceptually represents one embodiment of a hash tree for a root hash which may correspond to a backup.

With reference additionally now to FIG. 4, a conceptual representation 400 is shown of how a hash file system and method may be utilized to organize data 402 to optimize the reutilization of redundant sequences through the use of hash values 406 as pointers to the data they represent and wherein data 402 may be represented either as explicit byte sequences (atomic data) 408 or as groups of sequences (composites) 404.

The representation 400 illustrates the tremendous commonality of recipes and data that gets reused at every level. The basic structure of the hash file system of the present embodiment is essentially that of a "tree" or "bush" wherein the hash values 406 are used instead of conventional pointers. The hash values 406 are used in the recipes to point to the data or another hash value that could also itself be a recipe. In essence, then, recipes can point to other recipes that point to still other recipes that ultimately point to some specific data, eventually getting down to nothing but data.

At the topmost level of the tree of FIG. 4, a hash can be performed to generate a root hash 410. Because the hashes performed at each level of the tree result in the production of probabilistically unique hash values for each corresponding piece of data or composite upon which the hash is performed, the existence of the root hash 410 implicates the existence of the all the data and composites beneath the root hash somewhere in the data storage management system 140. In other words, if the root hash 410 exists in the database 212 (e.g., as one of the existing hashes 214), then all of the data referenced at any level within the tree of the root hash 410 exists somewhere on the system 140. Conversely, if data stored on the system 140 is not referenced or pointed to by a root hash, there is no need to store the data on system 140 and it can be collected away.

Variations and permutations of the hash file systems and methods discussed with regard to FIGS. 2-4 can be used to generate backups of client data. A backup may generally be described as a snapshot of data in a system, directory, etc. at a particular point in time. For example, the backups 152 of FIG. 1 may include snapshots of the stored client data 198, the client data 116 on the client server 114, the client data 126 on the remote client 120, and the like or any combination thereof, generated at different times (e.g., hourly, daily, weekly, etc.). Typically, the backups 152 represent a secondary copy of the client data from a particular point in time, whereas the stored client data 198 represents the primary copy of the most current client data. Additionally, the size of a backup can be minimized, thereby conserving memory, by including only new/changed data in the backup. What constitutes new/changed data can be determined against the stored client data 198 and/or the stored backups 152.

Figure 5A:
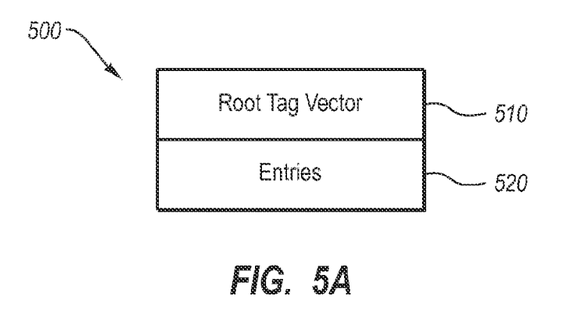
FIGS. 5A, 5B, and 5C illustrate embodiments of a cache that can be maintained on a client and used in generating backups.
Figure 5B:
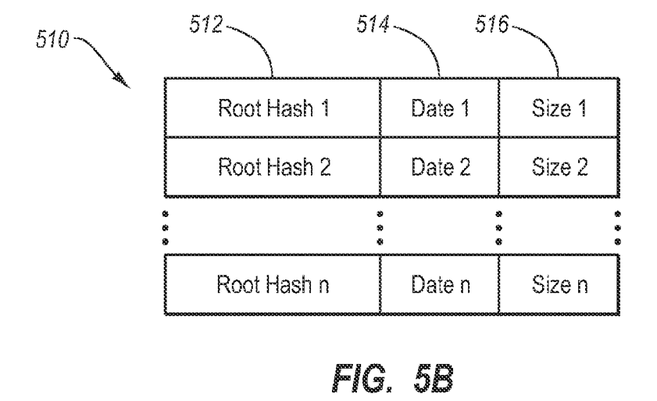

According to one embodiment of the invention, the caches 118 and/or 122 can be used in generating backups when the HFS server 140 is unable to contemporaneously process the backups. FIG. 5A illustrates one embodiment of a cache 500 that may correspond to the caches 118 and/or 122 of FIG. 1. As illustrated in FIG. 5A, the cache 500 includes a root tag vector 510 and one or more entries 520. In one embodiment illustrated in FIG. 5B, the root tag vector 510 is an array identifying a plurality of root hashes (1 to n) corresponding to previous backups 152. The root tag vector 510 may include a first column 512 containing the root hashes of one or more backups 152 stored in the HFS server 140, a second optional column 514 indicating the date a corresponding backup was performed, and a third optional column 516 indicating the size of bytes represented by the corresponding backup. In one embodiment, the root tag vector 510 identifies up to 16 root hashes corresponding to 16 backups performed by the client in whose cache the root tag vector is stored. However, the number of root hashes identified in the root tag vector can more generally be described as the number of backups typical of a given client.

Figure 5C:
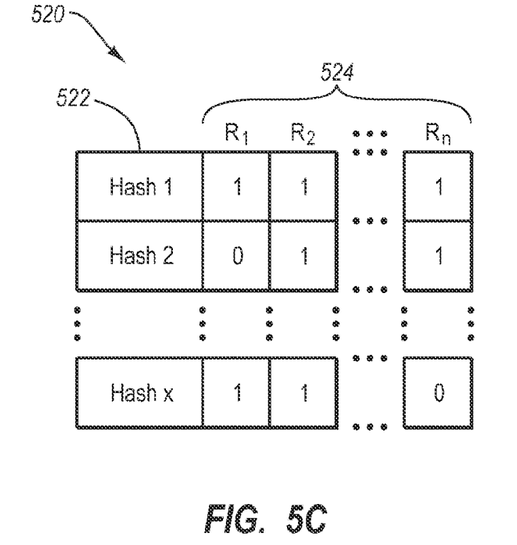

One embodiment of the plurality of entries 520 included in the cache 500 is illustrated in FIG. 5C, depicting a hash cache. Each entry includes a hash 522 of the content of a piece of data previously backed up and a tag field 524 indicating which backups the piece of data is protected by. More specifically, the tag field includes 1 to n bits that identify one or more root hashes (e.g., $R_1$, $R_2$, ... $R_n$) the piece of data is protected by. As already mentioned above, the existence of a root hash implicates the existence of all the data and composites beneath the root hash somewhere on the HFS server 140 (or elsewhere on the system). In the present case, for example, the existence of root hash 1 ($R_1$) implies that the content represented by hash 1 and hash X is stored on the HFS server 140. Similarly, the existence of root hash 2 ($R_2$) implies that the content represented by hash 1, hash 2 and hash X is stored on the HFS server 140 while the existence of root hash n ($R_n$) implies that the content represented by hash 1 and hash 2 is stored on the HFS server 140.

In another embodiment of the invention, the entries 520 included in the cache 500 may constitute a filename cache. According to this embodiment of the invention, each of the entries 520 may include a metadata hash in addition to the content hash 522. For instance, the metadata hash may comprise a hash of a path, file name, attributes such as author, modify date, etc., and/or other metadata corresponding to the piece of data represented by the content hash 522.

The implementation of the cache 500 in one or more of the caches 118 and 122 of FIG. 1 advantageously enables client-side generation of backups with little or no assistance from the HFS server 140. Two such methods for generating backups with little or no assistance from an HFS server 140 are described with respect to FIGS. 6 and 7, aspects of which may be useful in generating backups when the server 140 is unable to contemporaneously process the backups. The methods 600 and 700 of FIGS. 6 and 7 use one or more of the steps and features (or variations thereof) described with respect to the previous figures and reference may accordingly be made thereto.

Figure 6:
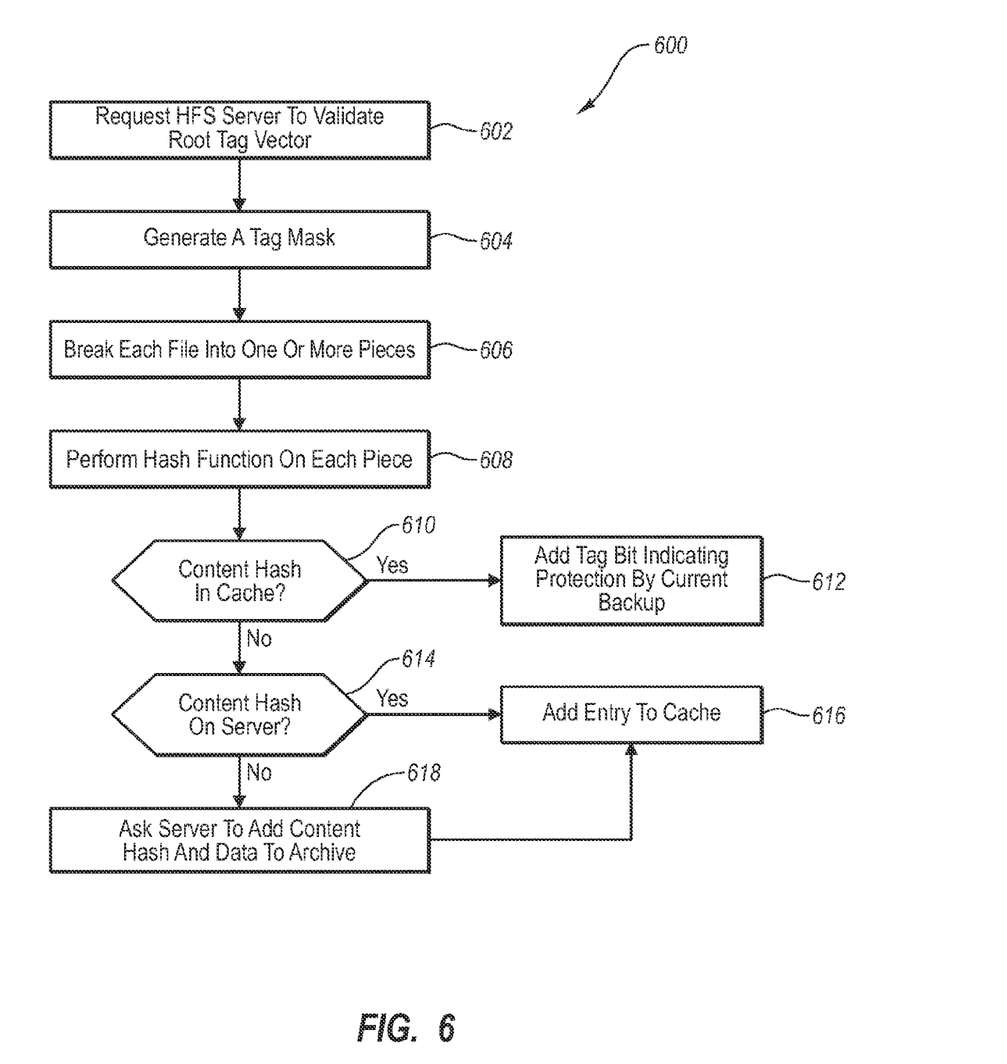
FIG. 6 illustrates one embodiment of a method for generating a backup.

The method 600 will be described in the context of the client server 114 backing up to the HFS server 140, with the understanding that the method can apply in many other situations, such as in the case of the remote client 120 backing up to the HFS server 140. The method 600 of generating a backup begins by the client server 114 requesting 602 the HFS server 140 to validate the root tag vector stored in the cache 118. In one embodiment, asking the HFS server to validate the root tag vector comprises asking the HFS server if the root hashes identified by the root tag vector exist on the HFS server 140 (or elsewhere on the system 100). In one embodiment, the HFS server returns a bit sequence or some other response to the client server identifying those root hashes that exist with a nonzero value, and identifying those root hashes that do not exist with a zero value.

One skilled in the art will appreciate that one or more root hashes may no longer exist on the HFS server 140 where they have been "aged out" of the HFS server. For instance, the HFS server 140 may implement user-defined and/or default retention policies with respect to backups 152. Examples of retention policies include aging out each backup after a specified period of time from its creation, maintaining a specified number of backups and aging out the oldest and/or smallest backup when a new backup is being created, and the like or any combination thereof. Accordingly, the HFS server 140 may age out one or more backups and their corresponding root hashes prior to and/or in response to receiving a validation request from the client server 110.

The method 600 continues by generating 604 a tag mask using the response from the HFS server 140 and the tags 524 of the cache 500 illustrated in FIG. 5C. The tag mask combines the tag field 524 of the entries 520 with the bit sequence returned by the HFS server 540 to identify (1) which hashes 522 are protected by which root hashes 512 and (2) which root hashes are still present on the HFS server 140. For example, if the response from the HFS server indicates that root hash 2 ($R_2$) no longer exists on the HFS server, that column would be zeroed out for each hash 522. Thus, a nonzero value for any bit in the tag mask indicates that a particular hash in the cache is protected by a particular root hash that has been validated by the HFS server.

The client server 114 then proceeds to iterate over all the files in the file system for which the backup is being generated in the following manner to build a hash tree and root hash representative of the current backup. The client server 114 breaks 606 each file into one or more pieces and performs 608 a hash on each piece to obtain a content hash or hash value. In the present example, the algorithm implemented to break 606 each file into pieces is the sticky byte algorithm described in the '398 patent referenced hereinabove, although other algorithms can also be used. In essence, the sticky byte algorithm divides data into pieces based on commonality with other pieces in the system or the likelihood of pieces being found to be in common in the future.

The client server 114 determines 610 whether a particular piece of data is protected by one or more backups by comparing its content hash to the cache entries. If the content hash matches an entry in the cache and the tag mask for the entry has one or more nonzero values (indicating that the entry is protected by one or more root hashes), the implication is that the corresponding piece of data is already stored somewhere on the HFS server and there is no need to send the new data to the HFS server. Instead, only the content hash, which is typically smaller than the corresponding piece of data, is added to the backup (and hash tree of the backup) ultimately sent to the HFS server. Further, if the content hash matches an entry in the cache, the tag bit corresponding to the current backup can be updated 612 to reflect that the entry will additionally be protected by the current backup.

If the content hash does not match an entry in the cache, the client server 114 next asks the HFS server to determine 614 whether the corresponding piece of data is stored on the HFS server (e.g., in the archive 194). This determination 614 may include the client server sending the content hash to the HFS server which the HFS server can compare to a database 212 of existing hashes 214. If the content hash is already stored on the HFS server, the client server 114 adds 616 an entry to the cache, the entry including the content hash and a tag bit indicating that the entry is protected by the current backup. Once again, only the content hash is added to the backup (and hash tree) ultimately sent to the HFS server since the corresponding piece of data is already stored on the HFS server.

If the content hash is not found on the HFS server, the client server asks 618 the HFS server to add the corresponding piece of data to the archive 194. In one embodiment, this includes the client server providing the content hash and the corresponding piece of data to the HFS server such that the HFS server can validate that the content hash corresponds to the piece of data and can store the data in the archive. Additionally, the client server can add 616 an entry to the cache for the piece of data.

By iterating over all the files covered by the current backup in the manner described, the client server is able to generate a backup comprised of a hash tree and only the new data not represented in either the cache or the HFS server. The client server can then perform a hash at the top level of the hash tree to obtain a root hash representative of the current backup. Additionally, the client server may ask the HFS server to add the root hash to the system such that it may be referenced during future backups.

In the embodiment of FIG. 6, the size of a backup is advantageously minimized by, among other things, not including pieces of data in the backup that are already stored on the HFS server. Instead, pieces of data already stored on the HFS server can be represented by hashes. Thus, only pieces of data not already stored on the HFS server and the hash representations of the already-stored pieces of data are included in the backup. Furthermore, the generation of the backup according to FIG. 6 is done with little assistance from the HFS server by maintaining a hash cache on the client that can be queried prior to querying the server.

Notwithstanding the benefits of generating backups at a client according to the method 600 of FIG. 6, at times it may be desirable to generate a backup on a client when the HFS server 140 is unable to contemporaneously process requests to add data and/or a root hash to the archive, as described with respect to FIG. 6. The HFS server may be unable to contemporaneously process requests for any of a variety of reasons. For example, the HFS server may be unable to process requests to add data from the server 114 and/or remote client 120 when the server 114 and/or remote client 120 are disconnected from the communications network 130. This may be a common occurrence where the remote client 120 is, for example, a laptop computer used in locations lacking network connectivity. Alternately or additionally, a failure in the network 130 may cause the client system 110 and/or remote client 120 to become disconnected from the HFS server 140.

In another embodiment of the invention, the HFS server is unable to contemporaneously process requests to add data to the archive 194 while the HFS server is performing maintenance on the archive 194. One specific example of such a maintenance operation is garbage collection. Garbage collection can be done to reclaim memory used by data objects that will no longer be accessed or mutated by any applications. In one embodiment of the invention, as backups/root hashes are aged out of the system 100, data objects referenced only by aged out backups/root hashes can be collected away from the archive 194 to reclaim memory during garbage collection. While garbage collection is discussed herein, other maintenance activities performed by the HFS server 140 may prevent the HFS server from contemporaneously processing requests to add data to the archive 194 as well.

Figure 7:
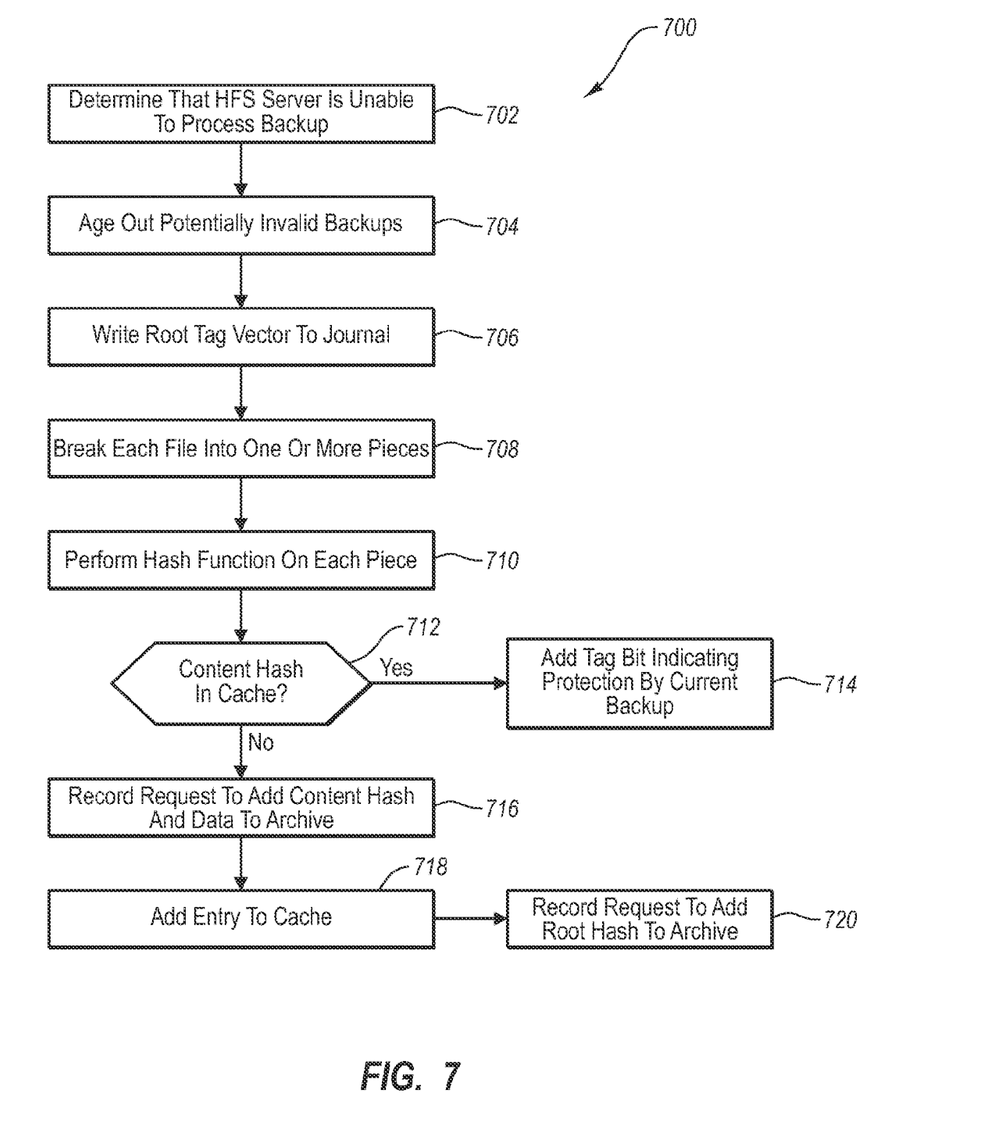
FIG. 7 illustrates another embodiment of a method for generating a backup on a client when a backup server is unable to contemporaneously process the backup.

Accordingly, one embodiment of a method for generating a backup while the HFS server is unable to contemporaneously process requests to add data is described with respect to FIG. 7. Advantageously, the method 700 of FIG. 7 can be performed with no assistance from the HFS server. The method 700 will be described in the context of the remote client 120 backing up to the HFS server 140, with the understanding that the method can apply in many other situations, such as in the case of the client server 114 backing up to the HFS server 140. Further, at least two example situations are discussed, including the disconnection of the remote client from the HFS server 140, and the performance of maintenance by the HFS server 140.

The method 700 of generating a backup begins by the remote client 120 determining 702 that the HFS server 140 is unable to contemporaneously process a backup. In one embodiment of the invention, determining 702 that the HFS server is unable to contemporaneously process a backup comprises determining that the remote client 120 lacks a connection to the HFS server 140. Alternately, the remote client 120 may first request the HFS server to validate the root tag vector and/or process a request to add data to the archive 194 and receive a busy response from the HFS server, whereupon the remote client determines 702 that the HFS server is unable to process a backup.

The method 700 continues with the remote client opening a journal file and writing 706 the root tag vector from the cache to the top of the journal. The root tag vector written to the top of the journal constitutes the remote client's assumptions about the data stored on the HFS server. Consequently, prior to writing the root tag vector to the journal, the remote client may optionally age out 704 one or more of the backups from the root tag vector and generate a tag mask as discussed above with reference to FIG. 6. In one embodiment, the remote client ages out backups from the root tag vector based on factors including the amount of time the HFS server is likely to be unable to process the current backup, the age and/or size of the backups identified in the root tag vector, and the retention policies implemented by the HFS server. For example, if the remote client 120 typically remains disconnected from the network 130 for 5 days at a time (e.g., while traveling), the remote client may age out backups that are likely to expire within those five days before writing the root tag vector to the journal. Similarly, if a maintenance activity of the HFS server 140 typically takes 24 hours to complete, backups that will expire prior to the completion of the maintenance activity can be aged out.

As illustrated in FIG. 1, the journal file may be stored on the remote client itself when the remote client is disconnected from the network 130 or the HFS server 140 is performing maintenance on the archive 194. In the latter case where the HFS server 140 is performing maintenance on the archive 194, the journal file may alternately or additionally be stored in the memory 190 of the HFS server. In both cases, the HFS server can process the journal file after the remote client restores its connection to the HFS server or after the HFS server completes maintenance.

Returning to FIG. 7, the method 700 continues with the remote client iterating over all the files in the file system for which the current backup is being generated to build a hash tree and root hash representative of the current backup. That is, the remote client breaks 708 each file into one or more pieces and performs 710 a hash on each piece to obtain a content hash or hash value. As mentioned above, the algorithm implemented to break 708 each file into pieces may be the sticky byte algorithm described in the '398 patent, or some other algorithm.

The remote client determines 712 whether a particular piece of data is protected by one or more backups by comparing its content hash to the cache entries, as described above with respect to FIG. 6. If the content hash matches an entry in the cache (and the tag mask for the entry has one or more nonzero values), only the content hash is added to the backup ultimately sent to the HFS server and the tag bit corresponding to the current backup can be updated 714 to reflect that the entry will additionally be protected by the current backup.

If the content hash does not match an entry in the cache, the remote server records 716, in the journal file, a request to the HFS server to add the corresponding piece of data to the archive. This includes, in one embodiment, recording the content hash and the corresponding piece of data in the journal file. Optionally, the remote client can add 718 an entry to the cache, the entry including the content hash and a tag bit indicating that the entry is protected by the current backup. The content hash is further used in the hash tree for the backup ultimately sent to the HFS server.

After the remote client has iterated over all the files covered by, and generated a hash tree for, the current backup, the remote client can perform a hash at the top level of the hash tree to obtain a root hash representative of the current backup and record 720, in the journal file, a request to the HFS server to add the root hash to the archive 194. In the event that the journal file is stored on the remote client itself, the remote client may transmit the journal file to the HFS server at a later time, such as when the remote client is reconnected to the network 130, upon determining that the HFS server has completed maintenance and is able to process the backup file, or at any other time after completing the backup.

Figure 8:
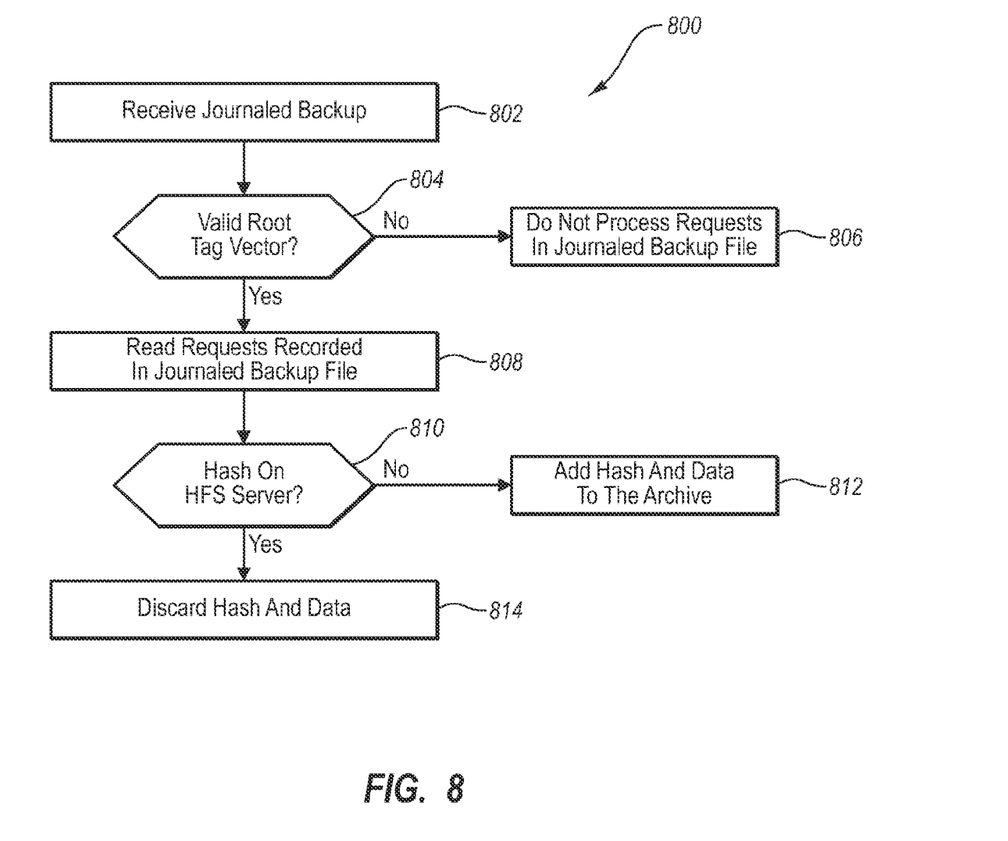
FIG. 8 depicts one embodiment of a method for processing a journaled backup file according to embodiments of the invention.

The journaled backup generated according to the method 700 of FIG. 7 can then be processed by the HFS server at a later time. For example, FIG. 8 depicts one embodiment of a method 800 for processing a journaled backup. The method 800 begins by the HFS server receiving 802 a journaled backup for processing. The HFS server reads the root tag vector from the top of the journal and determines 804 whether the root tag vector is valid. This determination may include comparing the root hashes of the root tag vector to root hashes stored in the archive 194 or another location accessible to the HFS server. Because the journaled backup is generated by a client under the assumption that the backups corresponding to the root hashes of the root tag vector exist in the archive, if one or more of the root hashes do not exist in the archive, the root tag vector is invalid and the HFS server does not process 806 the requests recorded in the journaled backup file.

However, if all of the root hashes of the root tag vector exist in the archive, the root tag vector is valid and the HFS server can proceed to process the requests recorded in the journaled backup file. Processing the requests recorded in the journaled backup file may comprise repeating the steps 808, 810, 812 and 814 until all of the requests have been processed. More particularly, the HFS server reads 808 a request, such as a request to add a content hash and its corresponding piece of data or a request to add a root hash, and then determines 810 whether the hash (e.g., content hash or a root hash) already exists in the archive 194.

If the hash does not already exist on the HFS server, the HFS server adds 812 the hash and corresponding piece of data to the archive. In some cases, however, the client that created the current backup may have aged one or more previous backups out of its root tag vector that still exist in the archive 194 when the journaled backup is processed by the HFS server. As a result, in this case (and in other cases) the client may have recorded in the journaled backup a request to add a content hash and corresponding piece of data that already exist in the archive 194, even though there was no match for the content hash in the cache of the client. Hence, if the hash of the current request already exists in the archive 194, the HFS server discards 814 the content hash and data to the archive.

Embodiments within the scope of the present invention include computer-readable media for carrying or having computer-executable instructions or electronic content structures stored thereon, and these terms are defined to extend to any such media or instructions that are used with a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection to a computer or computing device, the computer or computing device properly views the connection as a computer-readable medium. Thus any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Compute-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of generating a backup file on a client, the method comprising:
   determining by a client that a hash file system server is not currently able to contemporaneously process a backup from the client, the client including a computer device, wherein the backup is a backup of a file directory accessible to the client;
   breaking each file of the file directory into one or more pieces;
   writing by the client a root tag vector to a journal file accessible to the client, wherein the root tag vector includes one or more root hashes stored in one or more caches accessible to the client and wherein the one or more caches additionally store one or more entries representing data protected by the one or more root hashes, wherein each of the one or more entries includes a tag field that is n bits long and a hash of a piece of data, wherein the n bits in the tag field correspond to the one or more root hashes stored in the one or more caches of the client, and each tag bit indicates whether a corresponding root hash protects the entry;
   determining by the client that the one or more pieces of data of the backup are not identical to data represented by the one or more entries by performing a hash on each of the one or more pieces of data and comparing each hash to the one or more entries; and
   recording by the client, in the journal file on a storage device, one or more requests to store the one or more pieces of data, wherein the one or more requests to store the one or more pieces of data can be processed by the hash file system server at a later time when the hash file system server is able to process the backup.

2. The method of claim 1, wherein the journal file is located on the client or on the hash file system server.

3. The method of claim 1, further comprising, prior to writing the root tag vector to the journal file, aging out of the root tag vector one or more potentially invalid root hashes representative of one or more corresponding backups not likely to be accessible to the hash file system server when the hash file system server processes the journal file at a later time.

4. The method of claim 1, further comprising, sending the journal file to the hash file system server for processing.

5. The method of claim 1, wherein the hash file system server is not currently able to process the backup from the client due to at least one of:
   the client being disconnected from the hash file system server; and
   the hash file system server performing maintenance on content addressed storage in which backups are stored.

6. The method of claim 1, further comprising:
   in response to determining that a particular piece of data is not identical to data represented by the one or more entries, adding the hash of the particular piece of data as an entry to the cache and updating a corresponding tag bit of the new entry to reflect That the particular piece of data represented by the new entry is protected by the current backup; and
   in response to determining that a particular piece of data is identical to data represented by an entry, updating a corresponding tag bit of the entry to reflect that the data represented by the entry is protected by the current backup.

7. A method of processing a journaled backup file generated by a client, the method comprising:
   receiving, at a server, a journal file of a backup from a client, wherein the client generated the journal file in response to determining that the server was unable to contemporaneously process the backup from the client and the client stored the journal file until the server was able to process the backup, wherein the server includes a computing device and the client includes a computing device and wherein the journal file includes:
      a root tag vector identifying one or more root hashes accessible to the client at the time of generating the journal file, wherein the one or more root hashes point to data accessible to the server in the past or currently; and
      one or more requests to store one or more pieces of data of the backup, the one or more pieces of data not protected by any of the one or more root hashes;
   validating the root tag vector by determining that the one or more root hashes point to data currently accessible to the server in part by identifying bits in a tag field n bits long, wherein the n bits correspond to the maximum number of root hashes that can be stored in one or more caches of the client, and wherein each tag bit indicates whether a corresponding root hash protects the entry; and
   processing the one or more requests to store one or more pieces of data in a storage device.

8. The method of claim 7, wherein the server was unable to contemporaneously process the backup from the client due to the server performing maintenance on content addressed storage in which backups are stored.

9. The method of claim 8, wherein the maintenance being performed on the content addressed storage includes garbage collection.

10. The method of claim 9, wherein the journal file of the backup is generated by the client writing the contents of the journal file to storage accessible to the server and distinct from the content addressed storage.

11. The method of claim 7, wherein the server was unable to contemporaneously process the backup from the client due to the client being disconnected from the server.

12. The method of claim 11, wherein the journal file of the backup is generated by the client writing the contents of the journal file to storage accessible to the client, and wherein the server receives the journal file from the client after a connection between the client and server is established.

13. The method of claim 7, wherein determining that the one or more root hashes point to data currently accessible to the server includes comparing each of the one or more root hashes to a plurality of root hashes accessible to the server, wherein the plurality of root hashes accessible to the server point to data currently accessible to the server.

14. The method of claim 7, wherein each request to store a piece of data includes the piece of data and a hash of the piece of data.

15. The method of claim 7, wherein processing each request to store a piece of data includes:
   comparing the hash of the piece of data to a plurality of hashes accessible to the server in content addressed storage; and
   in response to determining that the hash of the piece of data is identical to at least one of the plurality of hashes, discarding the hash of the piece of data and the piece of data; or
   in response to determining that the hash of the piece of data is not identical to at least one of the plurality of hashes, storing the piece of data and the hash of the piece of data in the content addressed storage.

16. The method of claim 7, further comprising:
   receiving a second journal file of a second backup from the client, the second journal file including a second root tag vector identifying a second set of one or more root hashes accessible to the client at the time of generating the second journal file and one or more requests to store one or more pieces of data of the second backup;
   invalidating the second root tag vector upon determining that at least one of the second set of one or more root hashes points to data not currently accessible to the server; and
   in response to invalidating the second root tag vector, discarding the second journal file and not processing any of the one or more requests to store one or more pieces of data of the second backup.

* * * * *